United States Patent

[11] 3,616,194

[72] Inventor William T. Russell
North Manchester, Ind.
[21] Appl. No. 781,200
[22] Filed Dec. 4, 1968
[45] Patented Oct. 26, 1971
[73] Assignee Wall-Away Corporation
Wabash, Ind.

[54] FIBROUS SILICATE PRODUCTS AND METHODS AND APPARATUS FOR THEIR PRODUCTION
8 Claims, 4 Drawing Figs.

[52] U.S. Cl..................................... 161/210,
117/60, 117/115, 117/152, 156/189
[51] Int. Cl....................................... B32b 13/08
[50] Field of Search........................... 117/60,
115, 152; 156/189; 161/210

[56] References Cited
UNITED STATES PATENTS
1,751,971 3/1930 Barnum....................... 29/605
2,243,296 5/1941 Sweetland.................... 210/204
2,399,982 5/1946 Britt........................... 162/181

Primary Examiner—John T. Goolkasian
Assistant Examiner—Robert A. Dawson
Attorney—Stevens, Davis, Miller & Mosher ABSTRACT: New composited fibrous products comprising alkali metal silicates, made from a plurality of layers of a silicated fibrous substrate such as a strong, dense Kraft paper are disclosed. A wide variety of products in the form of panels, tubes, both round and multisided, containers, such as boxes and drawers for furniture, desks and the like, or formed by shaping and forming said layers in the manner of laminating; for example, by heat and pressure in a press, or a combination of press and mandrel. The stock material for the laminating operation contains the silicate in the voids of the paper continuously from surface to surface, as viewed in cross section. The silicate content is at least one-fourth pound per pound of substrate. The silicated paper stock is produced by techniques which cause the silicate to penetrate the paper in a surface-to-surface manner, and, when laminated, the silicate unifies through all layers.

INVENTOR.
WILLIAM T. RUSSELL
BY
Stevens, Davis, Miller & Mosher
ATTORNEYS

FIBROUS SILICATE PRODUCTS AND METHODS AND APPARATUS FOR THEIR PRODUCTION

This invention relates to new products which basically comprise alkali metal silicates and a supporting, or reinforcing, carrier substrate such as a paper. The invention relates also to methods and apparatus, and particular individual aspects of such methods and apparatus for producing the new products.

More particularly, the invention is concerned with the obtaining of new silicate-fibrous stock materials which not only are useful as such, but which are capable of utilization in manufacturing a great many useful consumer products, such as boxes, and containers in general, cabinets, drawers, furniture, concrete column forms, truck bodies, and like hollow objects formed with strong jointless corners, viewed as greatly improved over conventional products requiring joinery and fastening methods at corner joints. Further, these new stock materials may be readily laminated into more ordinary shapes including flat panels, round tubes, formed moldings, and in fact into any shape where heat and pressure may be applied to consolidate the mass, either consisting solely of such stock materials or in combination with other materials such as cloth, papers, plastic impregnated or coated webs, wood veneers, hardboards, metal sheets, metal mesh, or metal foils used either as interleaves in the laminated products or as surface material thereon. The possible uses for the new stock materials are substantially unlimited and advantages in many respects are afforded in areas of material cost, labor cost, production volume, and product appearance, strength, and durability.

In the overall, and by way of general outline in reference to a preferred form, the invention involves the provision of a relatively dry sheet material which may be considered as a length of paper containing within its body, i.e., within the void spaces existing within the Fibre structure, a quantity of a sodium silicate, for example, the very well known liquid silicate glass described by the formula $Na_2O:3.22\ Si_2xH_2O$. Conversely, such sheet material may be considered as a relatively thin layer or body of such silicate material within which, i.e., throughout its thickness, there is an interlocking matrix of fibrous material such as paper stock, for example, as provided by the well known Kraft 42 pound liner stock. This composite sheet stock is employed in compositing-laminating operations to produce the new products. It is also useful as a solid packaged adhesive, especially in joining to other stock materials as in laminating.

In considering the invention, it is important to recognize that the new sheet stock is constituted of two materials, each of which materials is continuous throughout the sheet length, and, more importantly, through the thickness of the sheet. More precisely and significantly, it is most important from the outset to perceive the sheet material as containing the silicate as a surface to surface continuum such that, in viewing the sheet stock in cross section, such silicate is a single united silicate body. This is not to say that all of the voids between the fibres are necessarily filled with silicate and that all of the fibrous material is fully surrounded by silicate, although such may be the case within the full scope of the invention; rather as a basic concept the invention involves the provision of such silicate in surface to surface continuity within at least a significant percentage of the voids on a more or less random basis as results from the sheet forming process. Optional variations in the forming process effect modifications in the characteristics of the sheet stock. It is not believed that such a sheet material has heretofore been conceived or provided as a useful material. As indicated above, many novel products may be made from this silicate-fibrous stock material; and since both the substrate and silicate are extremely low cost materials, products made from the stock material may be marketed at a greatly lower cost than when made from raw materials heretofore employed.

Silicates have heretofore been applied to paper or similar stock material as a surface coating, or wet adhesive, and perhaps on both sides thereof. Also, the art heretofore has referred to silicate application to a paper stock such that there is some permeation of the silicate beneath the surface of such stock. Such prior materials are unlike the present stock materials in that they do not provide the silicate as a substantially dry and united, surface to surface continuum, and therefore such prior materials are neither within the purview nor scope of this invention. Equally important, they are not capable of serving the objectives of this invention, as will become more apparent in considering this specification. At a later point herein, the methods by which such sheet materials are formed are described. Such methods involve procedural steps and environmental conditions that are highly important to observe and objectively maintain in practicing this invention; otherwise, it is not thought to be readily possible to carry the inventive objects herein into effect in any realistic sense.

It is envisioned that such sheet material may be produced in a continuous manner and collected in dried roll form for subsequent distribution and use; or it may be laminated immediately into useful end products. In mentioning the production of laminated products from the dried silicated sheet material, it is appropriate at this point to indicate that in such operation there is created a relatively thick composite stock which itself comprises, or embodies, the similar, in face essentially the same dual continuum of silicate and paper or the like fibrous stock. It has been discovered that such continuum results, or can be brought about, by heat and pressure which is effective in operating upon the heretofore little appreciated and, apparently, the totally heretofore unemployed thermoplasticity properties of the alkali metal silicates. More specifically, it has been discovered that when a plurality of superimposed sheets of the above described silicated sheet material are placed under heat and pressure, each to a suitable degree, there occurs a plasticizing effect from the heat and a flowing together or melding of the silicate at the surface of each of the superimposed sheets, thus resulting in the complete solid compositing of the sheets so that they no longer exist as such, insofar as the silicate is concerned. The silicate is caused to merge and leave no perceivable interface at the surfaces of the individual sheets.

The production of such composited materials has resulted in the bringing to light of a variety and combination of very important intrinsic attributes of the silicates of which little or no advantage has been taken heretofore. For example, while the good compressive strength and bonding ability of silicates have been frequently applied in practice, herein the natural thermoplastic character is employed to obtain "dry welding" and thermoforming behavior. Additionally the peculiar thermally responsive electrical resistance property of the silicates, heretofore little appreciated academically, and evidently not at all practically, may be employed to generate needed process heat within the products and/or to detect and thus control heat and moisture in processing steps. Further, herein the natural resistance to fire is utilized to permit high heats for quicker processing, and the attribute of being instantly and reversibly adjustable through the ranges of viscosity and plasticity and solidity is employed throughout the process steps by control of the heat and water variables; and certainly the low cost and availability characteristics of silicates are most significant herein.

To gain a more practical appreciation of those attributes as employed, perhaps some comparisons with older technology are helpful. Wet processes of gluing or casting fibrous webs, mats, or boards inevitably involve one or more serious problems of residual fibre stresses, shrinkage, warping, and wasted time in drying cycles. Thermoplastic resin systems used in comparable circumstances with fibrous webs involve one or more serious problems of flammability, high cost, expensive toxic solvents, lack of sufficient strength or hardness either owing to inadequate saturation or the weakness of the material itself. Thermosetting resin systems used in comparable circumstances with fibrous webs involve one or more problems of expensive toxic solvents, flammability, difficulty of preventing premature cure, wasted time in press equipment waiting for polymerization to occur, and high cost. And whereas simple resistance heating of silicate itself can provide instant heat generation within the products as needed, all alternative systems must depend upon essentially slow and/or expensive introduction of heat from outside sources. In summary, the silicated sheet stock and products made therefrom are more fireproof and they may be produced more rapidly and at a far less cost than in using similarly employable materials. Further, the peculiar silicate thermoplastic character of the sheet stock permits fabrication of boxes, drawers, containers and many other products by mandrel-molding or shape forming techniques, thus avoiding costly milling and subsequent putting together of milled pieces as is usually done in making such products.

In the course of making this invention, it has become apparent that the mere conception of or desire for such products (though no such conception or desire is thought to have existed heretofore) does not automatically or easily beget a process by which they may be brought into being. One of the basic problems arises from the selection of hard, dense, strong papers as substrate and it is difficult to effect surface to surface flowing or penetration of the silicate into or within such a suitably dense paper stock. One reason for difficulty is that when silicate is applied to paper, the paper ordinarily leaches sufficient water from the silicate to increase viscosity of silicate at the interface, thus forming a resistant barrier to further penetration. Not only is surface to surface penetration very difficult to accomplish, but as a practical matter it needs to be accomplished rapidly and with minimum dilution of silicate solution so as to deliver sufficient silicate solids into the paper and in order that drying of the stock is readily accomplished. Moreover, drying of a fully silicate-penetrated substrate involves inherent problems due to the tendency to form a surface layer or crust of solid silicate which occurs upon exposure to drying air and acts to seal the interior against moisture escape. It is important that excess water be removed, and in a rapid and controlled manner. Briefly, moisture should be removed to a content approximating equilibrium with normal ambient room conditions, or to lower moisture levels to prevent "blocking "; otherwise the sheet stock when collected in roll form, or as stacked sheets, will undergo surface to surface adhesions due to the natural adhesive properties of the silicate materials. This undesired adhesion occurs either under the pressure exerted by tightly wound paper, the wright of the roll itself and/or moisture absorption. The higher the water content of stock and the higher the ambient storage temperature, the more readily adhesion takes place. In preferred practice according to this invention, in preparing stock for interim storage, the silicate in the paper following drying is selected in the range of 63 percent to 75 percent solids content. Further, if rapid drying is done in uncontrolled humidity chambers, blistering and internal splitting of the paper substrate along its width and length occurs owing to internal steam pressure and outside crust and results in a highly inferior or useless beginning stock material.

Referring to the problem of effecting surface to surface penetration of the substrate, for example, paper, this invention involves the discovery that it is important to displace air contained in the voids of the paper and highly desirable that the paper fibers be initially moistened, immediately following which i.e., especially before air is allowed to return to the voids, the substrate should be exposed to the silicate saturant solution. According to the preferred practice described herein, this is accomplished by leading the substrate into a first zone where steam is caused to pass into the voids and, in so doing displace the air and moisten the fibers. The thus steam containing and moistened substrate is then led or transported into an interconnecting zone containing the silicate solution, at a relatively lower temperature the substrate being submerged therein. The steam condenses, creating a high vacuum which effectively draws the silicate into the paper, the water of condensation becoming a part of the silicate solution or perhaps the fibers as well. As above indicated it is very helpful in effecting penetration if the fibers are moistened, apparently because moistened paper does not quickly denude the silicate of its water content, which denuding causes the aforementioned solid silicate barrier formation. Additionally, the paper is heated by the steam and it does not tend to increase the silicate viscosity by chilling. It is concluded that problems of the above indicated nature have been strong factors in postponing the obtaining of materials and products as herein described.

For reasons not entirely and certainly understood, the silicate which is picked up in the "saturating" operation may not always provide a sufficiently continuous surface coating in dried state. Therefore, before the stock is dried or after, if preferred, it is preferable to lead it thru a second silicate bath.

Following the impregnating operations including preferably the final coating step, the treated stock is dried in any suitable fashion to the desired water content. It will be understood that optimum or even substantial commercial realization upon this invention involves enormous quantities of such treated stock; thus it is desirable that highly efficient drying technique be employed. Direct flame, hot air, and/or radiant heat drying is satisfactory, the humidity being maintained relatively high so that the tendency to rapid surface drying is reduced. As aforesaid, if the silicate forms a skin at the surfaces, moisture is trapped interiorly and the product is made more difficult to dry and make uniform. Drying may be accomplished electrically in a rapid and uniform fashion, the stock material being made the resistance element in the circuitry. In this method it is desirable to preheat the stock material since the resistance of the paper-silicate-water system drops greatly with increase in temperature. For example, in the case of a 65 percent solids solution of $Na_2O:3.22\ SiO_2$ the drop is extremely sharp in an order of magnitude of 1000:1 in the temperature range of about 20°–100° C, and continues to drop with higher temperature. Consequently voltage and current levels require to be adjusted in accordance with the temperature and moisture of the sheet in order to avoid charring.

Following drying, the sheet stock is ready for storage in roll or sheet form, or further use as in the laminating-compositing operation referred to above.

With regard to the use of the sheet stock in forming thick composite products it will be appreciated that the silicate therein is dry to the touch and not sticky at normal ambient conditions. Accordingly, in order to effect the desired end result of producing a relatively thick stock or article in which the silicate is present as a continuum, conditions during compositing must be such that the silicate will flow. In the method of this invention it is desirable if not essential that the temperature be limited to below the boiling point of water because the composite sheets contain sufficient water to generate steam inside the product and thus destroy or seriously damage it when external pressure is removed. The laminating-compositing operation is carried out under pressure and heat conditions sufficiently high to cause silicate flow in and between the several layers of sheet material and to effect the desired compaction of the separate layers. This is possible in the present invention since any useable silicate will result in sufficient plasticity at a temperature below 200° F., unless the stock is overdried. In other words, these silicates are not strictly rigid in such temperature range and with pressure they may be deformed or caused to flow, although in the context of this invention there is substantially no useful flow under normal temperature and pressure.

From the foregoing, it should be understood that the compositing operation involves conditions intended and calculated to induce true plasticity in the silicate by the effect of heat and pressure. This operation does not involve drying as a specific necessary objective. AS will be appreciated, drying, or reduction of water content, may be effected to any desired and suitable extent in the previous drying operation. It will be recognized that as water content is reduced, plastic flow properties change in relation thereto. Within the invention it is envisioned that water content of the stock material may be as low as is consistent with operable plasticity factors existing in the particular silicate system selected for use in the process and products. Another factor in the compositing operation depends upon pressure, that being the matter of effecting and maintaining the desired compression of the fiber-silicate body. The sheet material as formed presents irregular surfaces resulting from the fibrous content of the stock, and there appear to be one or more mechanical force systems inherent in the stock which oppose compression and which, even after compression release, tend to exert an elastic memory type of effect resulting in loss in the degree of compacting due to return to a state of repose. It is recognized that such occurrences are desirable to take into account since in some measure they are foreseen as capable of disrupting the extent of continuum which is established by pressure. Therefore, sufficient pressure is desirable to the end that temperatures may be lower, which lower temperature affords the advantage of higher cohesive strength in the silicate, absent pressure. Thus, when pressure is released, and despite fiber counter forces, compaction is retained to a significantly higher degree, apparently be reason of opposing silicate strength which immediately comes into operation upon pressure release. As should be appreciated from the foregoing, compaction is quite important in relation to product properties, especially strength and density. Good unification at the interfaces is hindered unless the fibers are intimately compacted; and, unless such unification occurs, cleavage surfaces remain at the interfaces, resulting in a weak product.

Pressures in the range of about 100 to 1000 p.s.i. or higher are found to be suitable, specified desired pressures being related to product density, pressing temperature, and moisture content of the silicate, both latter factors affecting plasticity. In practice, moisture content preferably is held rather closely to a constant. Accordingly, the optimum temperature and pressure condition in relation to particular silicates is readily established.

The soluble alkali metal silicates as a class, mixtures thereof, ternary systems, i.e., substances, such as sodium-lithium silicates, are applicable in practicing the invention. It is suitable to employ materials in the range of about 2–5 $SiO_2:Na_2O$, such being, in the main, readily available. As higher siliceous ratio materials become available, they also may be employed. Viscosity of such materials are known to increase with increasing siliceous content and solution solids content may be adjusted according to specific impregnation, drying and compositing conditions adopted in practice following the teaching herein. The quantity of such silicates desirable to include in the stock is directly related to the extent of saturation and the concentration of saturant silicate solution. According to this invention, selection of concentration is determined according to the ultimate desired density strength, and hardness of the end-products, e.g. in a range resembling soft woods to twice the hardness of hard maple. Thus, in practicing the invention a low density, yet sufficiently strong product in view of intended use, may be obtained by employing more dilute solutions and impregnating, i.e., saturating, the paper stock to such extent as necessary. Heavy duty materials requiring higher strength characteristics may be obtained by employing more concentrated silicate solutions, and effecting increased saturation. As will be appreciated, many generally similar but specific sets of conditions involving variation in silicate concentration and degree of saturation may be selected according to the desired objective.

In a given impregnation operation, the extent of saturation depends upon several factors, including paper density, thickness, porosity, the particular silicate and its viscosity at the applied temperature (which of course is related to its dilution), residence time of the paper in the solution and pressure, if such is employed.

Thus, changing any one of these conditions will have at least some effect on the end product.

Especially useful products are found to be obtained containing from about one-fourth pound to 1 pound of silicate per pound of paper stock, such determination being made while regarding the silicate as a solution containing about 68 percent solids by weight, as such solution exists in the dried paper stock material. This silicate to paper weight relation is easily determined in the stock material by weight measurements made thereon following drying, and the extent of drying can easily be detected by electrical conductivity values related to stock samples prepared under carefully controlled conditions to provide standard reference data. The invention is more specifically illustrated in the discussion which follows in relation to FIGS. 1, 2, 3, and 4, wherein, FIG. 1 is a somewhat schematized illustration of the steaming, silicating and drying operations;

Figure 1:
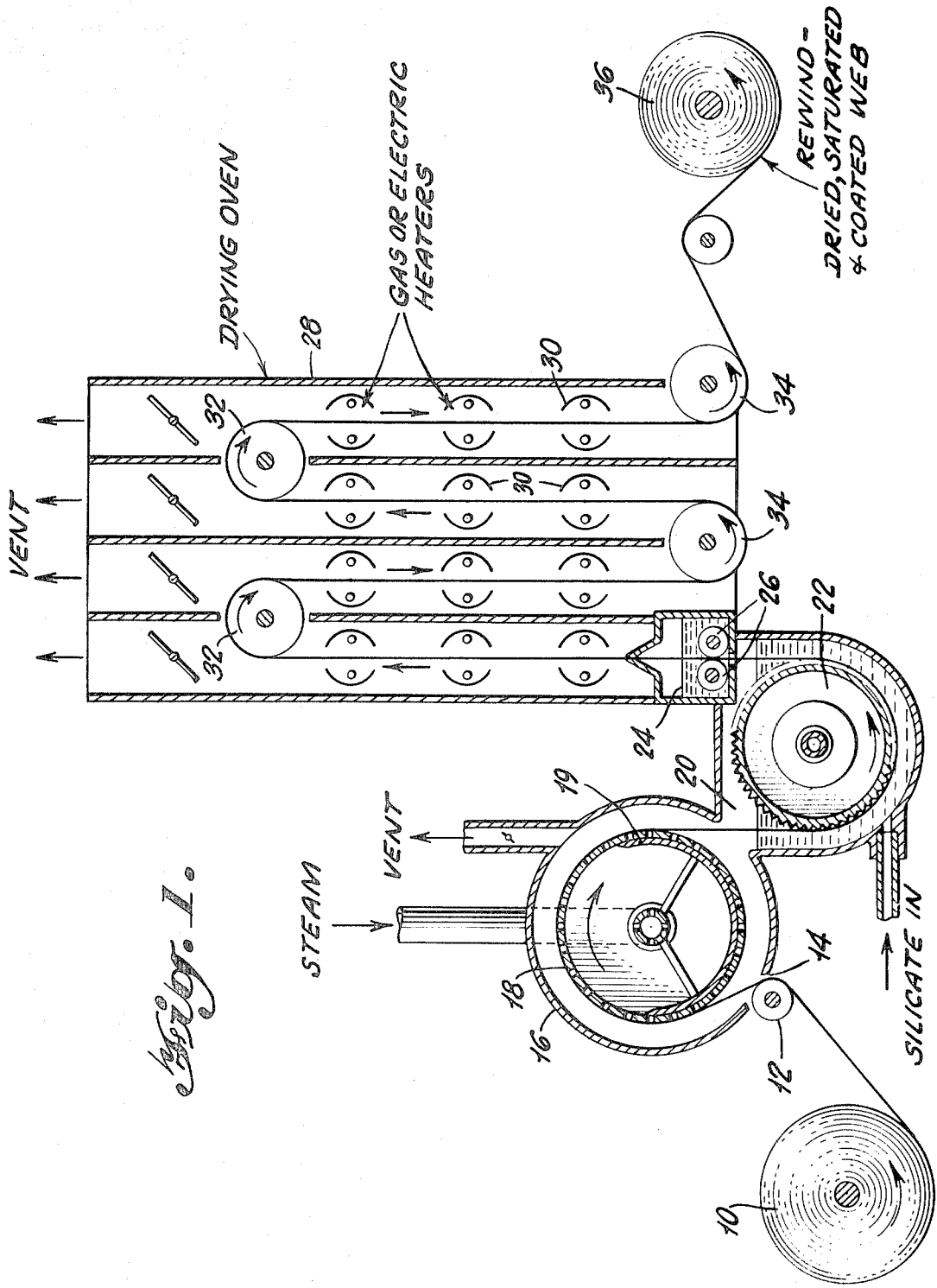

Referring to FIG. 1 showing the steaming, silicate applying and drying apparatus, numeral 10 denotes a mill roll of 42 lb. Kraft liner board paper rotatably mounted for delivery to the processing equipment. The paper is led over a guide roller 12 thru narrow slit 14 in cylindrical shroud 16. Numeral 18 denotes a perforated steam drum around which the paper is led and then immediately being led into the silicate saturating zone. Low pressure steam is delivered to the inside of drum 18.

Referring to FIG. 1 showing the steaming, silicate applying and drying apparatus, numeral 10 denotes a mill roll of 42 lb. Kraft liner board paper rotatably mounted for delivery to the processing equipment. The paper is led over a guide roll 12 thru narrow slit 14 in cylindrical shroud 16. Numeral 18 denotes a perforated steam drum around which the paper is led and then immediately being led into the silicate saturating zone. Low pressure steam is delivered to the inside of drum 18. Pressure of the steam causes the steam to pass thru the paper and in so doing, replace or displace the air contained in the voids, or interstices, of the paper. The effluent air and excess steam are vented. The path of travel of the paper during steaming is about 2 feet in machinery designed for paper moving at about 40 ft./min. The stationary plate 19 serves to prevent steam passage through drum perforations which are not covered by the paper.

As will be seen, the steam zone connects directly to a second zone 20 containing the silicate solution. The two zones are in direct communication and the paper is therefore not exposed to air.

Zone or chamber 20 contains a well-known sodium silicate solution, $Na_2O:3.22\ SiO_2$, the solution being 38.3 percent by weight silicate solids, weighing 11.67 lbs./gal., and having a viscosity of 206 centipoises at 20° C. The silicate is hot but its temperature is not allowed to rise above about 180° F. so that steam condensation takes place in the voids of the paper upon entry into the solution.

Drum 22 is rotatably mounted and has corrugated surface pattern so that there is a supply of silicate solution on both sides of the paper at all times.

The paper is led into the silicate around drum 22 at the aforesaid speed of about 40 ft./min., the silicate path being about 2 feet in length, during which time the paper is permeated surface to surface thru its thickness.

Numeral 24 denotes a second silicate application zone containing preferably more viscous silicate thru which the paper is led, between spreader rolls 26, at which time the aforementioned outer surface layers of silicate are applied to both sides of the paper stock.

Numeral 28 denotes a drying oven containing gas or electric heaters 30 adjusted to provide a steady heat of about 300° F., and effluent vents are adjusted to control humidity. It is desirable to maintain a high level of humidity in the drying oven so as to aid in preventing crust formation on the paper surface. This is readily accomplished by adjusting the vents seen at the top of the oven so that steam, which is generated from the water content of the paper, is held in the zone in the desired quantity. In this operation, both temperature and drying residence time (length of drying path and/or rate of stock movement) may be varied. The paper is led thru the drying path, which is about 80 ft. in length, alternately over rollers 32 and 34. In passing thru the drying zone, water content is lowered at least to room dry conditions represented by 50 percent relative humidity −70° F. Electrical conductivity measurements are made to detect moisture content of the paper by means not shown, the values obtained being compared against standards for conductivity at the desired standard conditions.

The paper stock is then dried and may be stored in roll form, as at numeral 36. The dried silicate in roll 36 has been reduced in water content to about 30 percent −35 percent. It is found that it is relatively stiff and somewhat brittle and can accept the pressure inherent in the mass of the roll, without sticking at the paper interfaces. However, with later steaming to provide heat the sheet stock can readily be made plastic as it is unrolled. Thus, the sheet stock is a convenient dry adhesive package for use in any laminating or surface joining operation without the need for water or prespreading of the adhesive.

Figure 2:
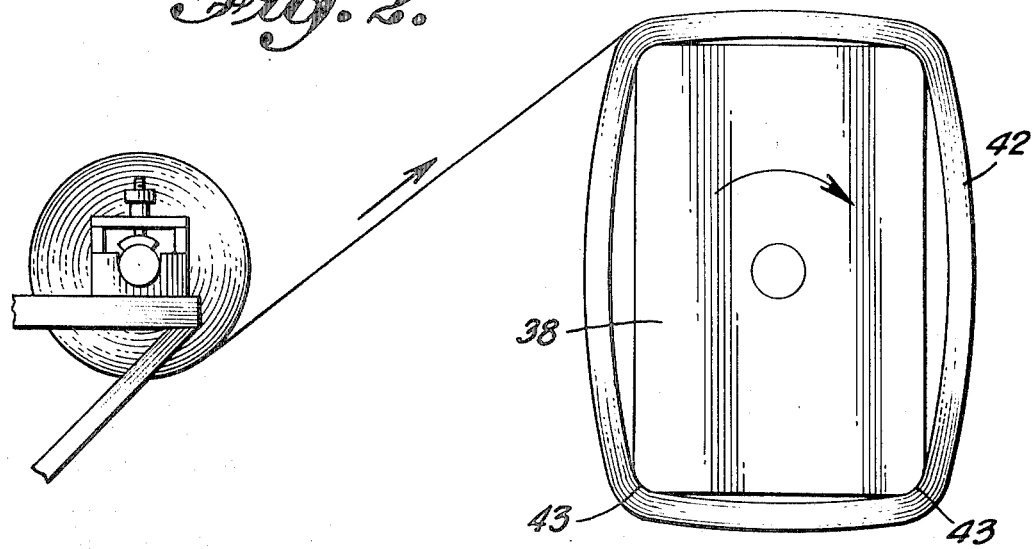
FIG. 2 illustrates a step and apparatus in one process of laminating-compositing-shaping products.
Figure 3:
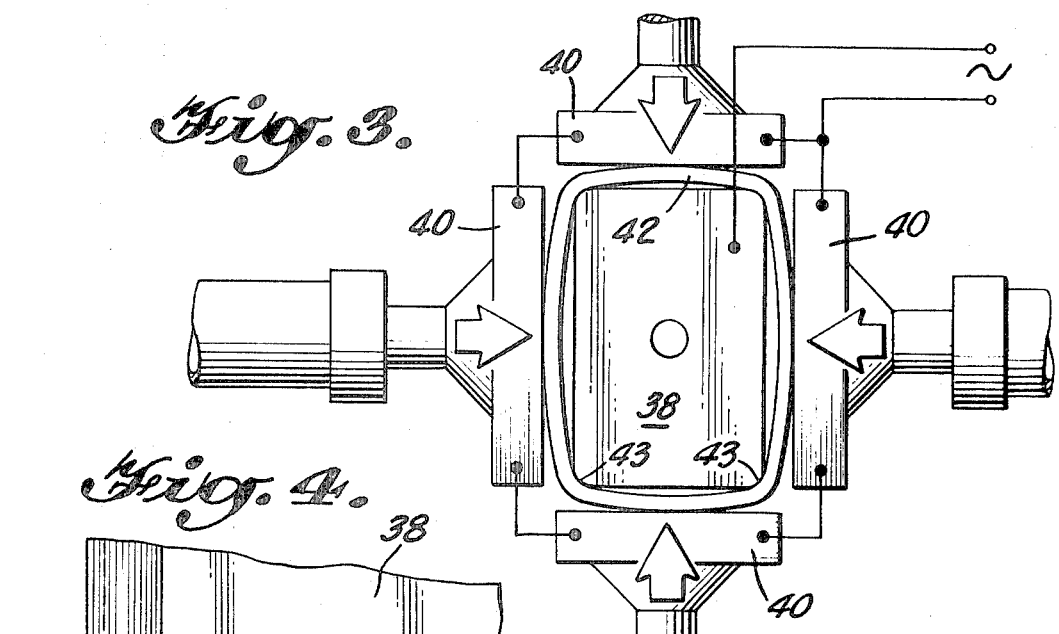
FIG. 3 illustrates a press and mandrel apparatus employed in the laminating-compositing-shaping operation.

Referring to FIGS. 2 and 3 there is seen a schematicized showing of a mandrel-press, in which composited products are made. As will be seen there is a central, rectangular mandrel 38 and four, press members numeral 40, about the periphery of the mandrel, each being adapted to apply pressure equally relative to the mandrel and the paper stock 42 wrapped thereabout. In use, the silicated stock, heated to about 140° F. is wrapped tightly about the mandrel, the mandrel being rotatably mounted and drawing the sheet stock either from roll 36, or directly from the dryer, and winding a product wall thickness as desired, e.g., about one-half inch (see FIG. 4). The mandrel is them moved into position between the presses. Pressure is applied by each at about 300 p.s.i. and heat is delivered simultaneously to the sheet stock sufficient to raise its temperature to about 180° F., whereupon no further dwell-time is required and pressure may be released. Although press platens 40 may be internally heated, heat is created within the plies of sheet stock most readily by passing about 150 watts per square inch of alternating current through the entire product assembly considering mandrel 38 as one pole and press members 40 to be the other pole of the circuit. Considerations of total electric heating load of the product can be closely estimated on the basis of 0.42 specific heat and it is not intended that any evaporative load should occur.

Although the process is not so limited, the product which is formed here is generally rectangular and in the form of the sidewalls of a cabinet drawer. If desired the bottom for the drawer may be simultaneously affixed within the said four walls. This is readily accomplished by holding a flat panel piece on the top side of the mandrel, the panel being very slightly larger than the mandrel, and allowing the wound paper stock to extend beyond the mandrel and overlap the edges of the panel. The panel in position on the mandrel, a flat steel sheet, similarly sized and shaped as the mandrel is then placed over it to provide bearing surface for the press of the sidewalls, the panel stock affording bearing surfaces along its periphery. When heat and pressure are applied, the bottom piece "-welds" securely into position and a complete drawer or other box shape is thus provided.

Figure 4:
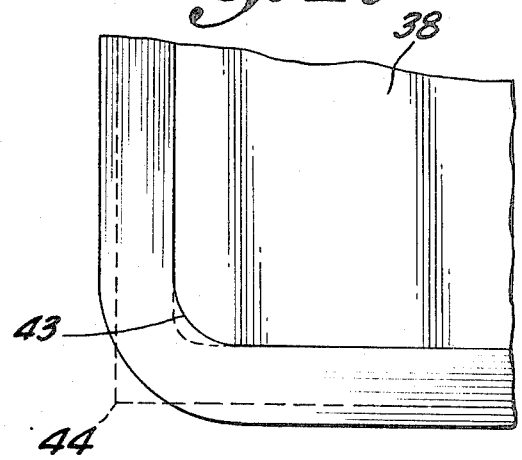
FIG. 4 illustrates a feature of the mandrel apparatus.

Referring to FIG. 4, reference numeral 43 denotes the corners of the mandrel 38 which is of simple solid construction, i.e., not collapsible. As will be seen, the corners are rounded. It has been discovered that there is great advantage in so constructing the mandrel for the reason that the composited material easily releases from the mandrel. Release from a solid mandrel having square corners is extremely difficult, if not impossible without damage to the product and in fact damage occurs during pressing owing to crowding at the corners. By way of further explanation and description, as will be appreciated upon reflection, and as shown in the drawings, when a paper is wrapped upon a rectangular mandrel, the paper assumes a slightly outward curve (exaggerated in the drawing) relative to the mandrel side surfaces. This is always the case, even though the paper layers are proportionately slightly longer than the adjacent mandrel surface. Additionally, it is readily appreciated that a paper at the point of turning the corners is extremely tight against the corners. It is found that when the mandrel corners are properly rounded, the paper adjacent thereto is caused to move away under the action of the applied pressure and thus automatically form a square outside corner on the product. A showing of this is seen in FIG. 4 at numeral 44. Rounded outside corners of products are equally easily achieved by increasing the size of radii on mandrel corners. In the press, the arc in the wound paper along the mandrel sides is flattened and the paper then is caused to extend away from and beyond the corners of the mandrel, thus releasing the extremely tight corner frictional holding. When the product is ready for removal, it slips easily away from the mandrel. This is not found to be possible with square cornered mandrels, which will neither promote easy release, nor provide for the proper amount of material to be present in the corner of the finished product. It is believed that for lack of understanding of the functions here described, attempts to form square or rectangular products, practical, simple mandrels have not been pursued by the art.

The method of silicating a substrate according to this invention is applicable to a wide variety of stock materials both thick and thin. Thus a thick paper board for example one-fourth inch or more may be similarly "saturated" or permeated thru its thickness, with functionally similar apparatus but differently laid out. However, it will be appreciated that longer processing time for each step will be required, especially if steam pressure is constant, or silicate viscosity is not lowered. Such a permeated board may be for example tunnel dried and then compacted to the desired density in any suitable manner.

The substrate may be of natural fibers such as cellulose in paper, synthetic fibers, glass fibers, metal fibers, or various mixtures thereof. However, as indicated above, preferably, the substrate should have good multidirectional strength in order to provide a well reinforced product, and to process well in the wet state.

What is claimed is:

1. A dry composite silicated material formed from a plurality of layers of silicated fibrous stock, the said stock containing silicate distributed randomly therein and extending entirely thru its thickness in the voids thereof as a surface to surface continuum, the silicate of said stock in said composite material being united across the juxtaposed faces of said stock and thereby providing said silicate in surface to surface continuity; the silicate content of said material being comprised of the soluble alkali metal silicates wherein the silicon oxide content relative to the alkali oxide content is in the weight ratio of at least about 2:1, said silicate, including associated water content, being present in said material to the extent of at least one-fourth pound per pound of fibrous layers; said fibrous stock, absent its silicate solution content, comprising a unified fibrous layer of substantial multidirectional strength.

2. A material as claimed in claim 1 wherein the said silicate is a sodium silicate.

3. A material as claimed in claim 1 wherein the said fibrous layer is a dense paper stock of the order of Kraft liner board stock.

4. A material as claimed in claim 2 wherein the said fibrous layer is a dense paper stock of the order of Draft liner board stock.

5. Silicated fibrous stock material, the said stock containing silicate distributed randomly therein and extending entirely thru its thickness in the voids thereof as a surface to surface continuum, the silicate content of said material being comprised of the soluble alkali metal silicates wherein the silicon oxide content relative to the alkali oxide content is in the weight ratio of at least about 2:1, said silicate, including associated water content, being present in said material to the extent of at least one-fourth pound per pound of fibrous material; said fibrous stock, absent its silicate solution content, comprising a unified fibrous layer of substantial multidirectional strength.

6. The silicated fibrous stock as claimed in claim 5 wherein the silicate is a sodium silicate.

7. The silicated fibrous stock as claimed in claim 5 wherein the said fibrous layer is a dense paper stock of the order of Kraft liner board stock.

8. The silicated fibrous stock as claimed in claim 6 wherein the said fibrous layer is a dense paper stock of the order of Kraft liner board stock.